(12) United States Patent
Czechowski et al.

(10) Patent No.: US 11,274,754 B2
(45) Date of Patent: Mar. 15, 2022

(54) MEMBRANE PUNCTURING MECHANISM

(71) Applicant: Goodrich Corporation, Charlotte, NC (US)

(72) Inventors: Kamil Czechowski, Wroclaw (PL); Piotr Zajac, Wroclaw (PL)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/715,000

(22) Filed: Dec. 16, 2019

(65) Prior Publication Data
US 2020/0191285 A1 Jun. 18, 2020

(30) Foreign Application Priority Data

Dec. 17, 2018 (EP) .................................... 18461647

(51) Int. Cl.
*F16K 17/14* (2006.01)
*F16K 17/40* (2006.01)
*B64D 25/00* (2006.01)

(52) U.S. Cl.
CPC .............. *F16K 13/04* (2013.01); *B64D 25/00* (2013.01); *F16K 17/14* (2013.01); *Y10T 137/1767* (2015.04)

(58) Field of Classification Search
CPC ......... F16K 13/04; F16K 17/14; B64D 25/00; Y10T 137/1767
(Continued)

(56) References Cited

U.S. PATENT DOCUMENTS 3,169,665 A 2/1965 Colley
3,749,282 A 7/1973 Day
(Continued)

FOREIGN PATENT DOCUMENTS

DE 1117433 B 11/1961
EP 3627034 A1 3/2020
(Continued)

OTHER PUBLICATIONS

Extended European Search Report for International Application No. 18461647.2 dated Feb. 27, 2019, 8 pages.
(Continued)

*Primary Examiner* — Kevin L Lee
(74) *Attorney, Agent, or Firm* — Cantor Colburn LLP

(57) ABSTRACT

A membrane puncturing mechanism comprises a first element and a second element arranged with opposing surfaces. At least one opposing surface comprises a sloping region inclined relative to the other opposing surface. The first element is moveable towards and away from the second element. A pin for puncturing a membrane is coupled to the first element such that movement of one of the pin and first element causes movement of both. A spring is operable to bias the first element towards the second element. An actuator is removably positioned between the opposing surfaces, the actuator being withdrawable from between and moveable along the opposing surfaces such that, as the actuator is withdrawn, the actuator progressively moves the first and second elements apart against the bias of the spring so as to load the spring and such that the actuator being fully withdrawn from between the opposing surfaces.

17 Claims, 16 Drawing Sheets

(58) Field of Classification Search
USPC .......... 137/68.3, 668.29, 68.23, 68.19, 68.11
See application file for complete search history.

(56) References Cited

U.S. PATENT DOCUMENTS

| | | | |
|---|---|---|---|
| 3,938,704 A | | 2/1976 | Milgram |
| 3,997,079 A | | 12/1976 | Niemann |
| 4,946,067 A | | 8/1990 | Kelsall |
| 4,959,034 A | * | 9/1990 | Wass ........................ B63C 9/24 |
| | | | 441/41 |
| 6,260,570 B1 | * | 7/2001 | Wass et al. ............... B63C 9/19 |
| | | | 137/68.3 |
| 6,260,571 B1 | * | 7/2001 | Lind et al. ................ B63C 9/24 |
| | | | 137/580 |
| 7,299,816 B2 | * | 11/2007 | Rouleau et al. ........ F16K 13/04 |
| | | | 137/68.3 |
| 2014/0020791 A1 | | 1/2014 | Anderson |

FOREIGN PATENT DOCUMENTS

| | | |
|---|---|---|
| GB | 263482 A | 4/1927 |
| GB | 662898 A | 12/1951 |
| WO | 02094617 A2 | 11/2002 |

OTHER PUBLICATIONS

EPO Official Letter for Application No. 18461647.2, dated May 12, 2021, 5 pages.

* cited by examiner

US 11,274,754 B2

MEMBRANE PUNCTURING MECHANISM

FOREIGN PRIORITY

This application claims priority to European Patent Application No. 18461647.2 filed Dec. 17, 2018, the entire contents of which is incorporated herein by reference.

TECHNICAL FIELD

The present disclosure relates to a membrane puncturing mechanism for use, for example, in an inflation valve.

BACKGROUND

Inflation valves are used in inflation systems that need to be inflated rapidly, such as those used in aircraft. An inflation valve has a membrane which is punctured to release high pressure inflating gas into an inflation system. Mechanisms used to puncture membranes in inflation valves use springs to accelerate a needle into the membrane. Springs in such mechanisms are fully preloaded and then released when the valve needs to be actuated. Maintaining a fully preloaded spring leads to a reduction in restoring force as the material of the spring relaxes over time. Therefore, it is possible that a spring that has been compressed in an inflation valve mechanism for a long time may not provide sufficient acceleration of the needle to puncture a membrane and the system will fail to inflate. Such a failure could be costly, time-consuming or dangerous, particularly if the inflation system is part of a safety system. The springs in these mechanisms may therefore need to be periodically replaced, placing an extra burden on servicing requirements. Spring relaxation can be lessened by using larger and heavier springs, however these are more costly and result in undesirably bulky and heavy mechanisms.

SUMMARY

An aspect of the present disclosure provides a membrane puncturing mechanism comprising a first element and a second element arranged with opposing surfaces. At least one opposing surface comprises a sloping region inclined relative to the other opposing surface. The first element is moveable towards and away from the second element. A pin for puncturing a membrane is coupled to the first element such that movement of one of the pin and first element causes movement of both. A spring is operable to bias the first element towards the second element. An actuator is removably positioned between the opposing surfaces, the actuator being withdrawable from between and moveable along the opposing surfaces such that, as the actuator is withdrawn, the actuator progressively moves the first and second elements apart against the bias of the spring so as to load the spring and such that the actuator being fully withdrawn from between the opposing surfaces allows the first element to move towards the second element under the load of the spring thereby moving the pin for puncturing the membrane.

Both opposing surfaces may comprise a sloping region, each sloping region being inclined relative to the other.

The or each sloping region may have a constant gradient.

The or each sloping region may provide a frustoconical recess in the opposing surface.

At least one opposing surface may be circular.

The second element may comprise an opening through which the pin passes.

The second element may be positioned between the spring and the first element.

The pin may comprise a narrowed throat portion for accommodating the actuator before the actuator is withdrawn from between the opposing surfaces.

The membrane puncturing mechanism may further comprise a mount for coupling the membrane puncturing mechanism to a valve, wherein the mount houses the spring and part of the pin.

The membrane puncturing mechanism may further comprise a bushing which couples the mount to the second element to allow the second element to rotate relative to the mount.

The actuator may be a ball.

The membrane puncturing mechanism may further comprise a locking element moveable between a locked position to prevent removal of the actuator from between the opposing surfaces and an unlocked position to allow removal of the actuator from between the opposing surfaces.

The locking element may comprise a lid which fits over the first element and in its locked position prevents movement of the first element away from the second element, the mechanism further comprising a cam surface and follower arranged such that rotational movement of the locking element lifts the locking element away from the first element, thereby allowing movement of the first element away from the second element in the unlocked position.

The second element may comprise an upstanding wall in which the cam surface is defined and the lid comprises the cam follower which is received by the cam surface, the cam surface optionally being formed as a groove.

The groove may comprise detents, optionally in the form of narrowed regions, to retain the cam follower in the locked and unlocked positions.

DETAILED DESCRIPTION

Figure 1:
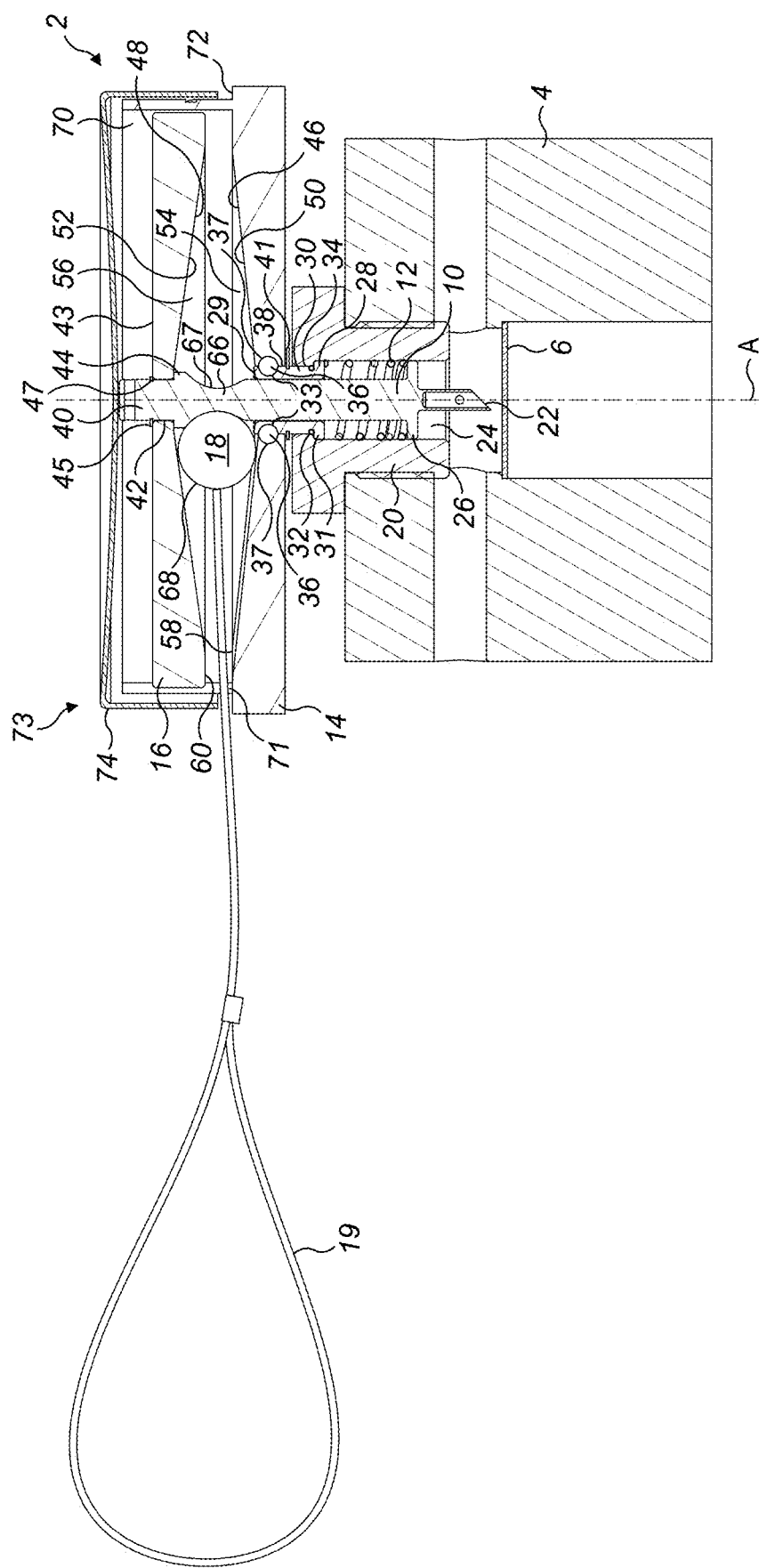
FIG. 1 is a cross-sectional view of a membrane puncturing mechanism in a locked holding state in accordance with this disclosure.

With reference to FIGS. 1 to 5, a membrane puncturing mechanism 2 is coupled to an inflation valve 4 for releasing gas into an inflation system, for example on an aircraft. The puncturing mechanism 2 actuates the valve 4 by puncturing a membrane 6. The puncturing mechanism 2 comprises a puncturing pin 10, a spring 12, a lower element 14, an upper element 16, an actuator 18 and a mount 20. The mount 20 houses the spring 12 and part of the pin 10 and couples the puncturing mechanism 2 to the valve 4. The pin 10 has a sharp end 22 which is used to puncture the valve membrane 6.

The upper and lower elements 14, 16 are arranged to lie horizontally with the lower element 14 on top of the mount 20 and the upper element 16 above the lower element 14. The actuator 18 is receivable between the elements 14, 16. The elements 14, 16 and actuator 18 allow the spring 12 to be loaded and then released to force the sharp end 22 of the pin 10 into the membrane 6. The elements 14, 16 and actuator 18 also allow the puncturing mechanism 2 to be held in a configuration that prevents puncturing of the membrane 6.

The puncturing mechanism 4 is configurable between three states: a holding state (FIGS. 1 to 3) in which the puncturing mechanism 2 holds the pin 10 away from the valve membrane 6 to prevent actuation of the valve 4; a fully loaded state (FIG. 4) in which the puncturing mechanism 2 has loaded the spring 12 by drawing the pin 10 further away from the membrane 6; and a released state (FIG. 5) in which the puncturing mechanism 2 has released the pin 10 and spring 12 has extended the pin 10 far enough out of the mount 20 for the sharp end 22 to make contact with and puncture the valve membrane 6 to actuate the valve 4.

With reference to FIGS. 1 to 7, the mount 20 has an inner bore 24 through which the pin 10 extends and in which the spring 12 is arranged. The bore 24 and pin 10 share the same longitudinal axis A. The spring 12 is arranged in the bore 24 of the mount 20 and in contact with the pin 10 so that it can be compressed by movement of the pin 10 along the axis A relative to the mount 20. In this embodiment, the spring 12 is a coil spring that is loaded via compression. In other embodiments, the spring 12 may be an extension spring, or the spring 12 may be another type of resilient member, for example a piece of elastic material.

The mount 20 comprises a bushing 30 partially received within top 34 of the bore 24, coupling the mount 20 to the lower element 14. The spring 12 is coiled around the pin 10 from a flange 26 on the pin 10 to the base 28 of the bushing 30. The base 28 of the bushing 30 has a flange 31 which cooperates with a lip 32 inside the bore 24 to prevent removal of the bushing 30 out of the top 34 of the bore 24.

Bolts or screws 36 couple the bushing 30 to the lower element 14 so that the mount 20 and lower element 14 are held fixed along the axis A relative to each other and to the valve 4. The lower element 14 has a central opening 38 aligned with the axis A for receiving the pin 10 and bushing 30. The lower element 14 also has two bores 37 extending perpendicular to the axis A and partially passing through the opening 38 for receiving the bolts 36. The top end 29 of the bushing 30 has opposing external recesses 33 for partially receiving the bolts 36. The top end 29 of the bushing 30 is received in the opening 38 of the lower element 14. Each bolt 36 extends through a respective bore 37 in the lower element 14, passing through the recess 33 in the bushing 30 as the bolt 36 extends across the opening 38, and thereby securing the bushing 30 to the lower element 14.

The coupling of the bushing 30 to the opening 38 of the lower element 14 in this way allows rotation of the lower element 14 relative to the rest of the mount 20. Such rotation facilitates installation and use of the puncturing mechanism 2 since the components above the bushing 30 can be rotated to any position. The bushing 30 has an external circumferential groove 39 located axially between the recesses 33 and the flange 31 for receiving a retaining clip 41, such as a snap ring. The retaining clip 41 helps to retain the top end 29 of the bushing 30 within the opening 38 of the lower element 14 and spaces the lower element 14 from the mount 20 to facilitate the relative rotational movement between them.

The arrangement of the mount 20, bushing 30, pin 10 and spring 12 means that the spring 12 biases the pin 10 towards the valve 4 and movement of the pin 10 along the axis A away from the valve 4 compresses the spring 12 against the base 28 of the bushing 30 using the pin flange 26.

The compression of the spring 12 and the distance of the sharp end 22 of the pin 10 from the valve membrane 6 therefore depend on each other. Since the fully extended spring 12 in the released state of the puncturing mechanism 2 causes the sharp end 22 of the pin 10 to contact the valve membrane 6, the spring 12 is partially preloaded in the holding state to hold the sharp end 22 away from the membrane 6 and prevent actuation of the valve 4, as can be seen in a comparison of FIGS. 1 to 3 with FIG. 5.

The pin 10 extends from its sharp end 22 and flange 26 up through the bore 24 of the mount 20 and the opening 38 in the lower element 14 (also passing through the spring 12 and the bushing 30) to reach the upper element 16. The upper end 40 of the pin 10 is coupled to the upper element 16 so that the pin 10 and upper element 16 are moveable together relative to the mount 20 and lower element 14. Since the compression in the spring 12 is directly dependent on the position of the upper element 16 along the axis A, the spring 12 is loaded by moving the upper element 16 away from the lower element 14.

Movement of the upper element 16 along the axis A away from the valve 4 moves the pin 10 in the same direction to compress the spring 12. This withdraws the sharp end 22 of the pin 10 away from the valve membrane 6 and loads the spring 12 with enough restoring force to accelerate the sharp end 22 of the pin 10 into the valve membrane 6 with enough force to puncture the membrane 6 when the puncturing mechanism 2 is fully actuated. Movement of the upper element 16 results in a varying separation between the lower and upper elements 14, 16 because the lower element 14 is fixed to the valve 4 via the mount 20 in relation to the upper element 16 and pin 10. Correspondingly, the spring 12 biases the pin 10 and upper element 16 towards the valve 4 and thus the upper element 16 is biased towards the lower element 14. The restoring force of the compressed spring 12 will therefore act to decrease the separation of the lower and upper elements 14, 16 upon actuation.

The upper element 16 has an opening 42 which receives the upper end 40 of the pin 10. The pin 10 has a circular shoulder 44 with a wider diameter than the opening 42 so that the upper element 16 sits on the shoulder 44. The pin 10 protrudes from the opening 42 out of the top surface 43 of the upper element 16. The pin 10 has a circumferential groove 47 located axially between its upper end 40 and shoulder 44 for receiving a retaining ring 45 such as a snap ring. The retaining ring 45 is fitted around the pin 10 within the groove 47 and in contact with the top surface 43 the upper element 16 to maintain the mating of the upper element 16 and the shoulder 44 when the upper element 16 is moved away from the valve 4 and when the pin 10 is moved towards the valve 4 by the spring 12.

The top surface 46 of the lower element 14 faces the bottom surface 48 of the upper element 16. In this embodiment, the lower and upper elements 14, 16 are circular plates with circular opposing surfaces 46, 48 and the openings 38, 42 for the pin 10 and the axis A located in the centre of the circles. In other embodiments, the elements 14, 16 and the opposing surfaces 46, 48 may have any suitable shape, such as rectangular or hexagonal, and may differ from each other in shape. In the illustrated embodiment, each of these opposing surfaces 46, 48 comprises a sloping region 50, 52 which forms a frustoconical recess 54, 56 in each element 14, 16 with the openings 38, 42 in the centre of the narrow end of the frustum.

Movement of the upper element 16 and pin 10 along the axis A away from the valve 4 to load the spring 12 is effected by the movement of the actuator 18 along the sloping regions 50, 52. When the actuator 18 is located between the elements 14, 16 in the holding and fully loaded states, the actuator 18 is in contact with both opposing surfaces 46, 48. The contact is maintained due to the restoring force of the spring 12 biasing the moveable upper element 16 towards the relatively fixed lower element 14. The actuator 18 holds the elements 14, 16 apart from each other, as shown in FIGS. 1 to 4. FIG. 5 shows that in the released state the actuator 18 is not located between the elements 14, 16 and so the elements 14, 16 are in contact with each other at the flat outer regions 58, 60 of the opposing surfaces 46, 48.

By moving the actuator 18 in a radial direction between the elements 14, 16, the separation between the elements 14, 16 is varied due to the constant height $H_A$ of the actuator 18 and the sloping regions 50, 52 of the elements 14, 16. Since the position of the lower element 14 is fixed in relation to the mount 20 and the valve 4 but the upper element 16 can move along the axis A, the separation between the elements is varied by the upper element 16 moving towards and away from the lower element 14.

Figure 2:
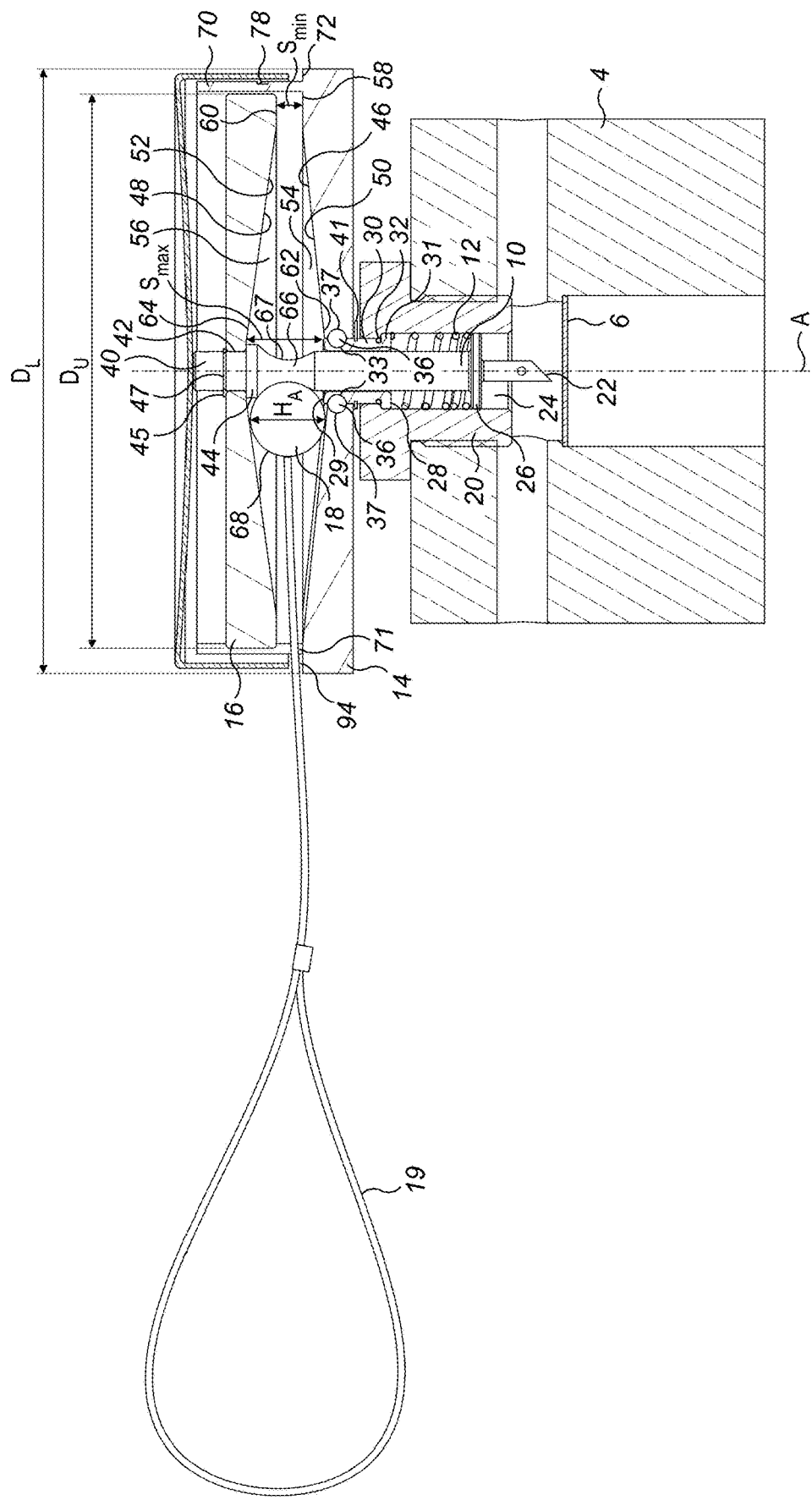
FIG. 2 is a part cross-sectional view of the membrane puncturing mechanism of FIG. 1.
Figure 4:
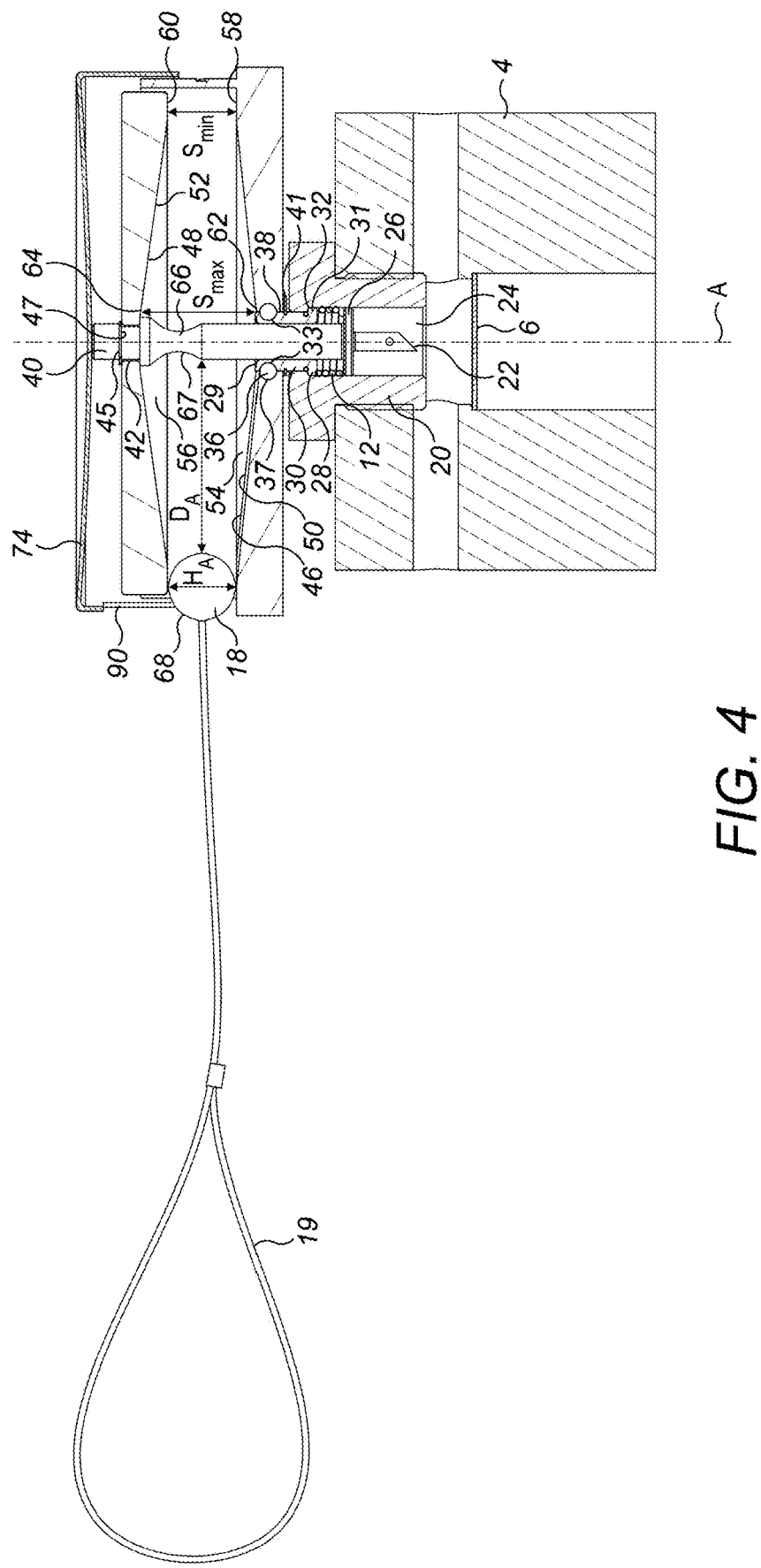
FIG. 4 is a part cross-sectional view of the membrane puncturing mechanism of FIG. 1 in a fully loaded state.
Figure 5:
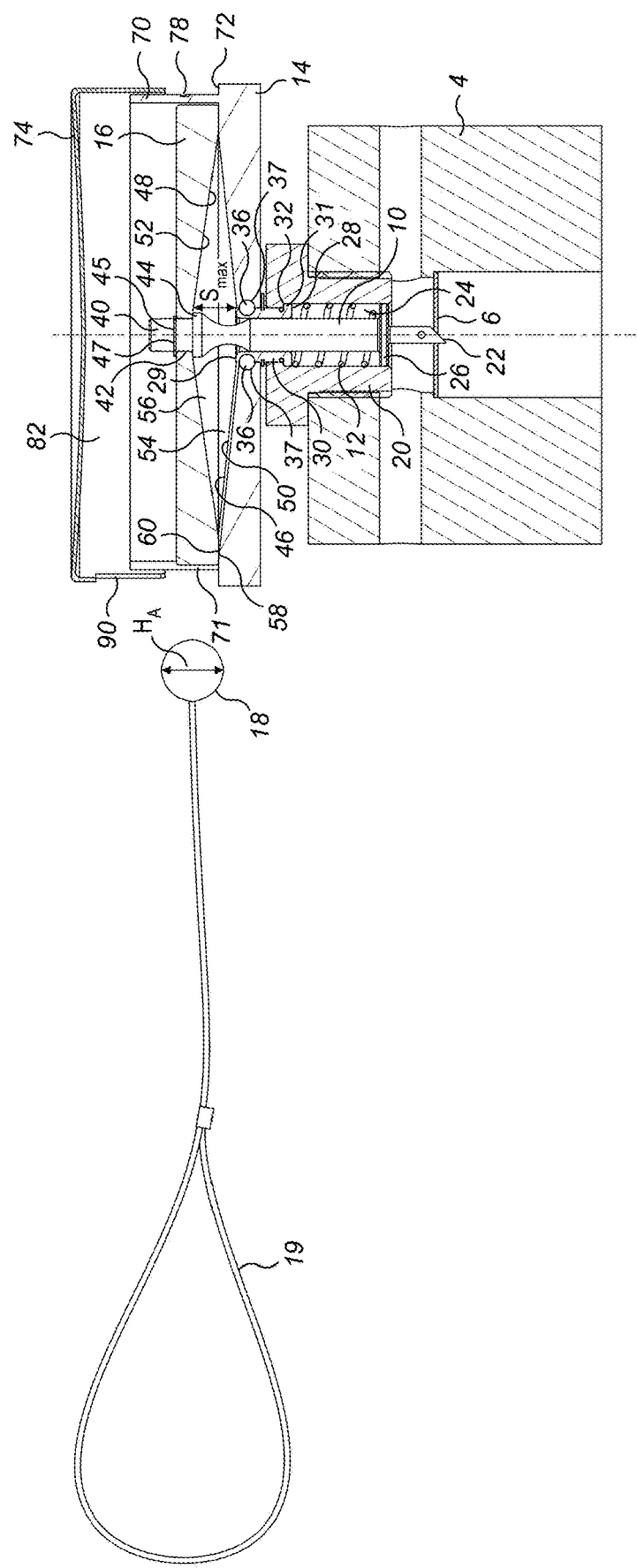
FIG. 5 is a part cross-sectional view of the membrane puncturing mechanism of FIG. 1 in an unlocked released state.

Due to the inclines of the sloping regions 50, 52, the largest separation $S_{max}$ between the opposing surfaces 46, 48 of the elements 14, 16 is between the edges 62, 64 of the openings 38, 42 and the smallest separation $S_{min}$ is between the flat outer regions 58, 60, as demonstrated in FIGS. 2, 4 and 5. $S_{max}$ and $S_{min}$ are variable and depend on the presence of the actuator 18 between the elements 14, 16 and, when the actuator 18 is present between the elements 14, 16, the distance $D_A$ of the actuator 18 from the central axis A, which runs through the centres of the openings 38, 42 and the pin 10. $S_{max}$ and $S_{min}$ are at their maximum in the fully loaded state and at their minimum in the released state. In the illustrated embodiment, $S_{min}$ is zero in the released state. However, in other embodiments, a stopper may be present between the lower and upper elements 14, 16 so that $S_{min}$ is greater than zero in the released state, provided that the sharp end 22 of the pin 10 can extend far enough to puncture the valve membrane 6. In the holding state, $S_{max}$ and $S_{min}$ are the smallest they can be while the actuator 18 is present between the elements 14, 16.

The actuator 18 has a constant height $H_A$ which separates elements 14, 16. When the actuator 18 is located between the elements 14, 16 and moves radially outwards, the actuator 18 pushes against the sloping regions 50, 52. The slope of the sloping region 52 on the upper element 16 translates the horizontal motion of the actuator 18 into vertical motion of the upper element 16 upwards away from the lower element 14. The upward motion of the upper element 16 draws the pin 10 upwards and away from the valve 4 to load the spring 12.

In the holding state, the actuator 18 is held against the pin 10, which is as close as the actuator 18 can get to the central axis A, which goes through the centre of the pin 10. The pin 10 has a narrowed throat portion 66 that is configured to contact or abut the actuator 18 when the puncturing mechanism is held in its holding state. The throat portion 66 has a reduced width relative to the main body of the pin 10. In various embodiments, the surface of the pin 10 at the throat portion 66 follows a contour of the surface 68 of the actuator 18. This localised narrowing enables the actuator 18 to be closer to the central axis A without compromising the strength of the rest of the pin 10. In this embodiment, the actuator 18 can be pulled away from the axis A by a lanyard 19 which is attached to the actuator 18 and extends outside the elements 14, 16.

Figure 3:
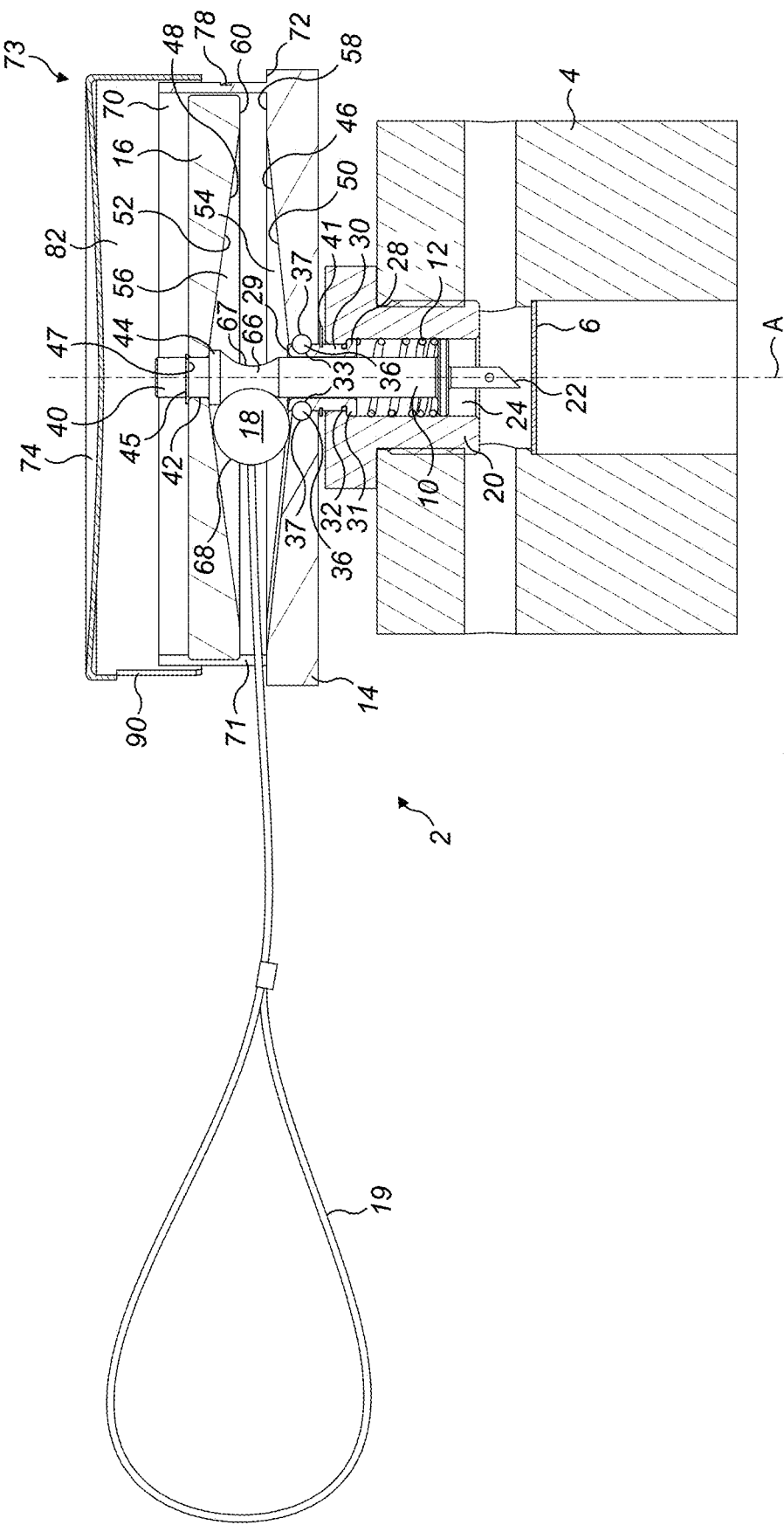
FIG. 3 is a part cross-sectional view of the membrane puncturing mechanism of FIG. 1 in an unlocked holding state.

When the puncturing mechanism 2 is held in its holding state, shown in FIGS. 1 to 3, with the actuator 18 between the elements 14, 16, the height $H_A$ of the actuator 18 provides the separation of the upper element 16 from the lower element 14 that is required to slightly compress the spring 12 to hold the pin 10 away from the valve membrane 6. $S_{max}$ is greater than the height $H_A$ of the actuator 18 and $S_{min}$ is less than the height $H_A$ of the actuator 18.

When the puncturing mechanism 2 is in its fully loaded state, shown in FIG. 4, the actuator 18 is positioned at the point of $S_{min}$ and therefore $S_{min}$ and $S_{max}$ are at their maximum, the upper element 16 and pin 10 at their greatest distance from the valve membrane 6, and the spring 12 compressed as far as possible.

When the puncturing mechanism 2 is in its released state, shown in FIG. 5, the actuator 18 is no longer between the elements 14, 16 holding them apart, so $S_{min}$ and $S_{max}$ are at their minimum. The flat regions 58, 60 of the opposing surfaces 46, 48 are in contact with each other, therefore $S_{min}$ is zero. In the released state, spring 12 has been released to its fully extended position and the upper element 16 and pin 10 have been moved downwardly by the spring 12 so that the sharp end 22 of the pin 10 punctures the valve membrane 6.

In this embodiment, the actuator 18 is ball-shaped and the throat portion 66 of the pin 10 has a curved recess 67 to accommodate the curved surface 68 of the actuator 18. The presence of the actuator 18 in the curved recess 67 provides further support for the pin 10 against the bias of the spring 12, in addition to the coupling of the upper end 40 of the pin and the upper element 16. The curved surface 68 of the actuator 18 minimises friction between the actuator 18 and the opposing surfaces 46, 48 by minimising the amount of contacting surface area.

In this embodiment, both the lower and upper elements 14, 16 have sloping regions 50, 52 and the sloping regions 50, 52 have the same circular geometry as the elements 14, 16, extending all the way round the opposing surfaces 46, 48 to form the frustoconical recesses 54, 56. However, in other embodiments, the sloping regions 50, 52 may be formed as ramps along a smaller portion of the opposing surfaces 46, 48 that slope away from the pin 10. Additionally or alternatively, only one of the lower and upper elements 14, 16 may have a sloping region 50, 52. However, providing sloping regions 50, 52 on both elements 14, 16 may be advantageous as it will minimise the vertical height of the mechanism. With only one element 14, 16 having a sloping region 50, 52, a steeper incline is needed to provide the same spring loading effect which may make withdrawal of the actuator 18 more difficult. In this embodiment, the sloping regions 50, 52 have constant gradients. The curved surface 68 of the actuator 18 and the constant gradient of the sloping surfaces 50, 52, which does not put any obstacles in the path of the actuator 18, allow for a smooth and fast withdrawal of the actuator 18 from between the elements 14, 16 when actuating the puncturing mechanism 2. However, in other embodiments, the gradient of one or both of the sloping regions 50, 52, or the gradient of the only sloping region 50, 52, varies.

As shown in FIG. 2, the lower element 14 has a diameter $D_L$ that is larger than the diameter $D_U$ of the upper element 16 to provide a supportive base for the upper element 16. The lower element 14 has a wall 70 which extends from the outer edge 72 of the lower element 14 and encircles most of the upper element 16, leaving a gap 71 to allow the actuator 18 to be removed from between the elements 14, 16 and out beyond the wall 70. The actuator lanyard 19 extends through this gap 71 to be accessible for a user to pull the actuator 18 out from between the elements 14, 16 when actuating the valve 4.

Referring to FIGS. 6 to 16, the puncturing mechanism 2 also has a locking mechanism 73 which can be moved between a locked position in which it prevents the movement of the upper element 16 away from the lower element 14, and an unlocked position in which it allows the movement of the upper element 16 away from the lower element 14.

Figure 8:
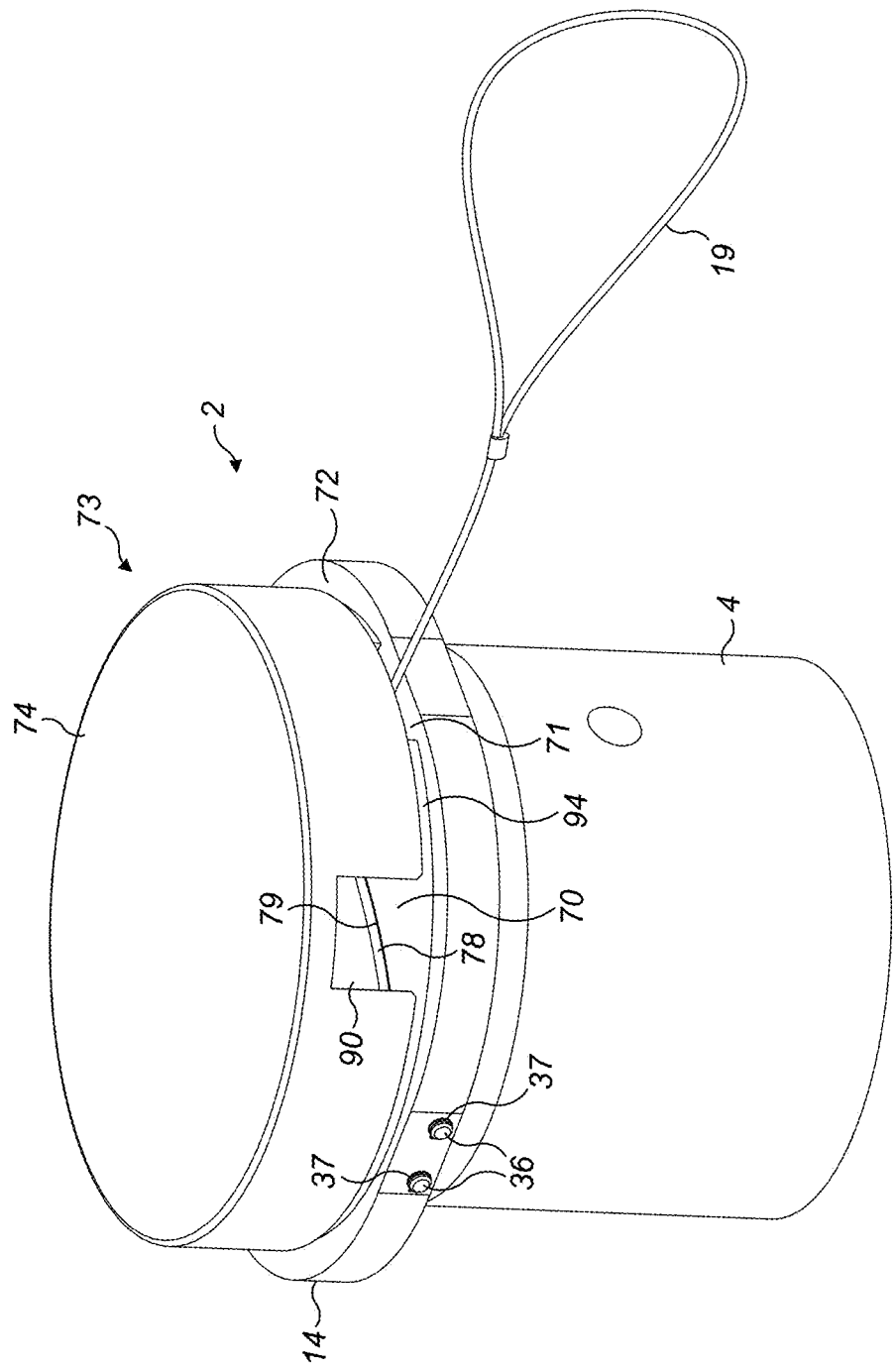
FIG. 8 is a perspective view of the membrane puncturing mechanism of FIG. 1.

In the illustrated embodiment, the locking mechanism 73 comprises a lid 74 which slides over the wall 70, covering the upper element 16 and pin 10. The lid 74 can be closed so that the inner top surface 76 of the lid 74 meets the upper end 40 of the pin 10 when the puncturing mechanism 2 is in the holding state, as shown in FIGS. 1, 2 and 8. This prevents the upper element 16 and pin 10 from moving upwards to allow the actuator 18 to be moved from its position between the elements 14, 16. This prevents accidental actuation of the valve 4. In the illustrated embodiment, the lid 74 is sloped towards its centre to meet the upper end 40 of the pin 10. In other embodiments, the lid 74 is flat above the pin 10 and upper element 16.

Figure 9:
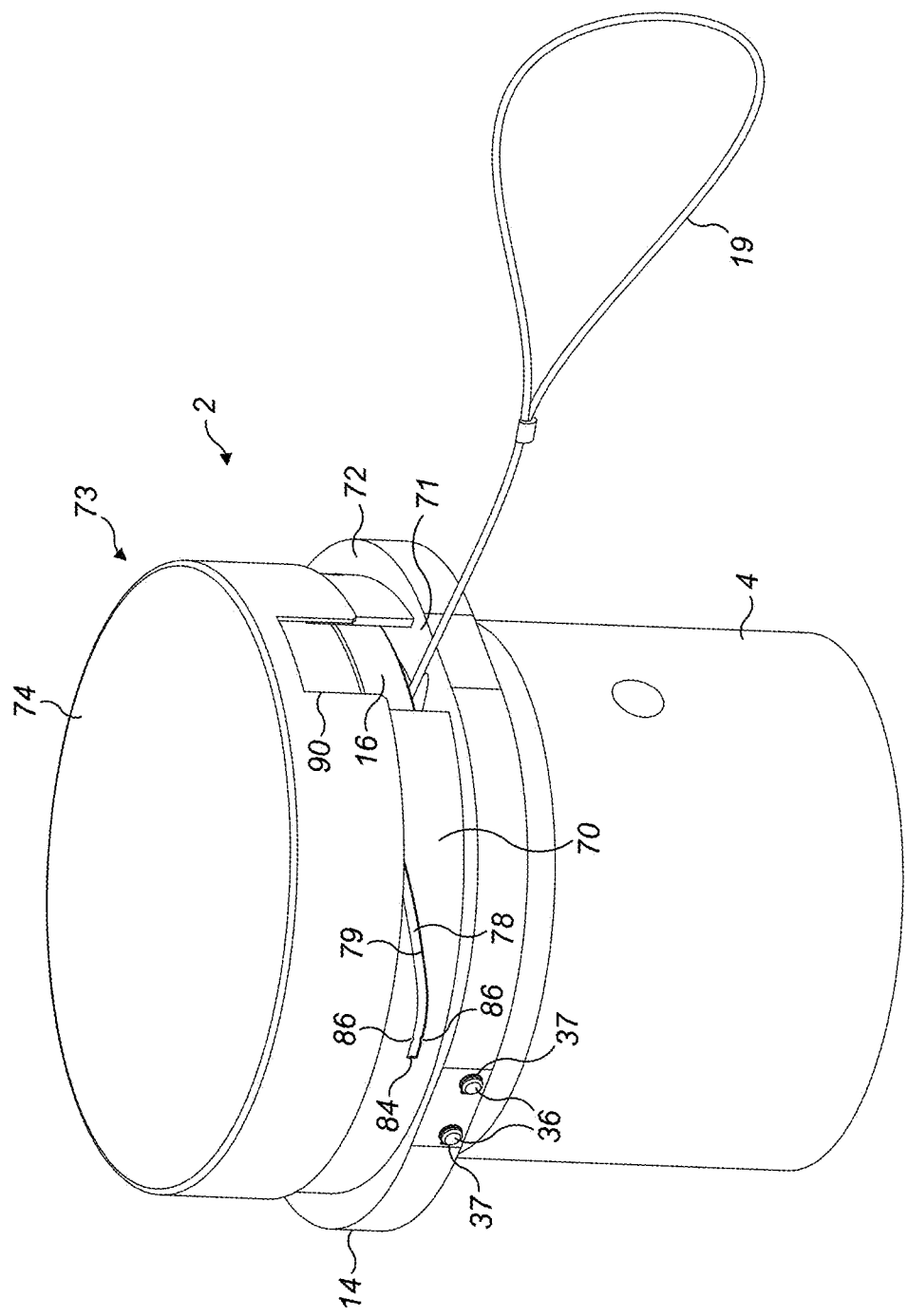
FIG. 9 is a perspective view of the membrane puncturing mechanism of FIG. 1 in an unlocked holding state.
Figure 10:
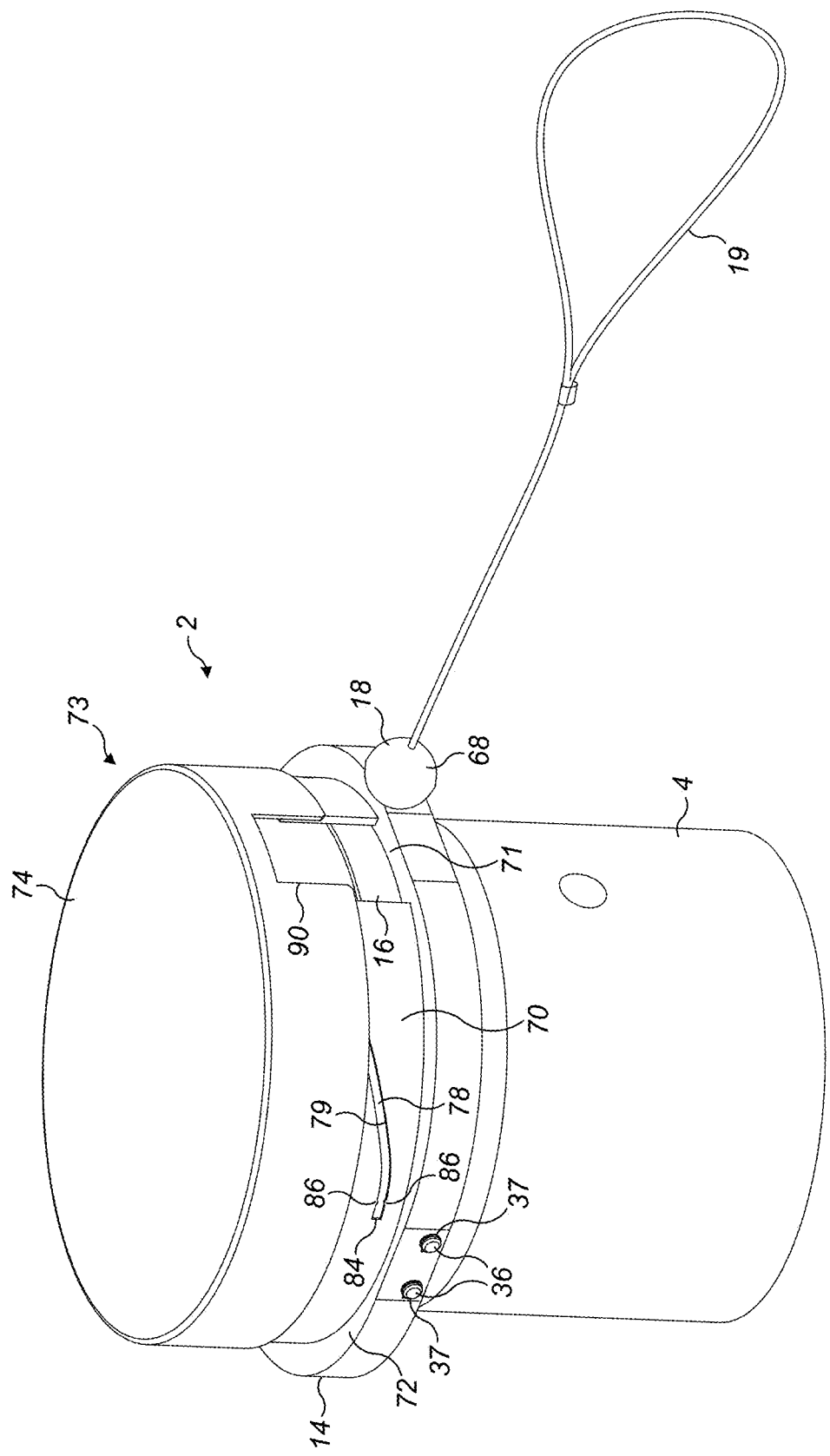
FIG. 10 is perspective view of the membrane puncturing mechanism of FIG. 1 in an unlocked released state.
Figure 11:
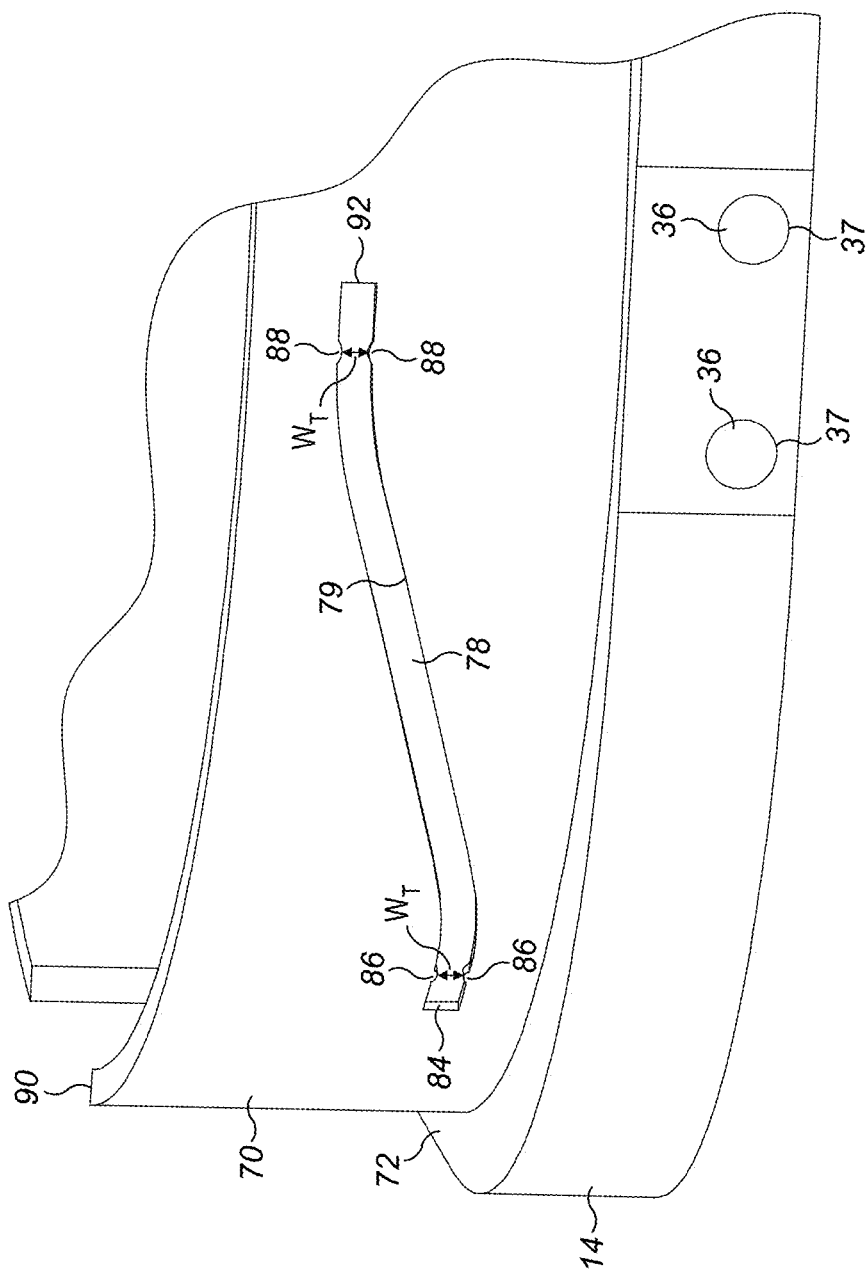
FIG. 11 is a close-up side view of part of the membrane puncturing mechanism of FIG. 1.
Figure 12:
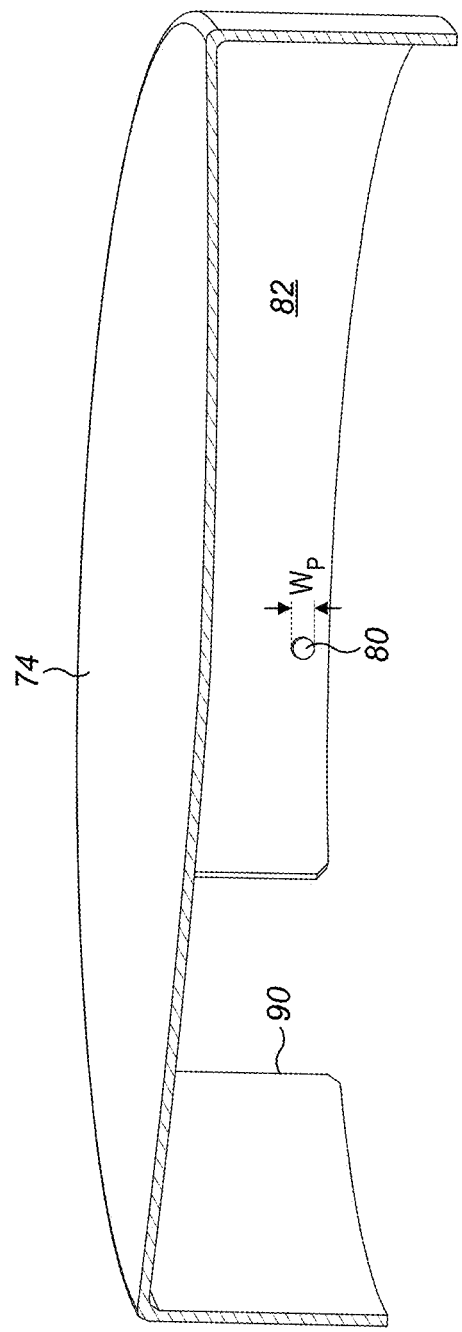
FIG. 12 is another close-up side view of part of the membrane puncturing mechanism of FIG. 1.
Figure 13:
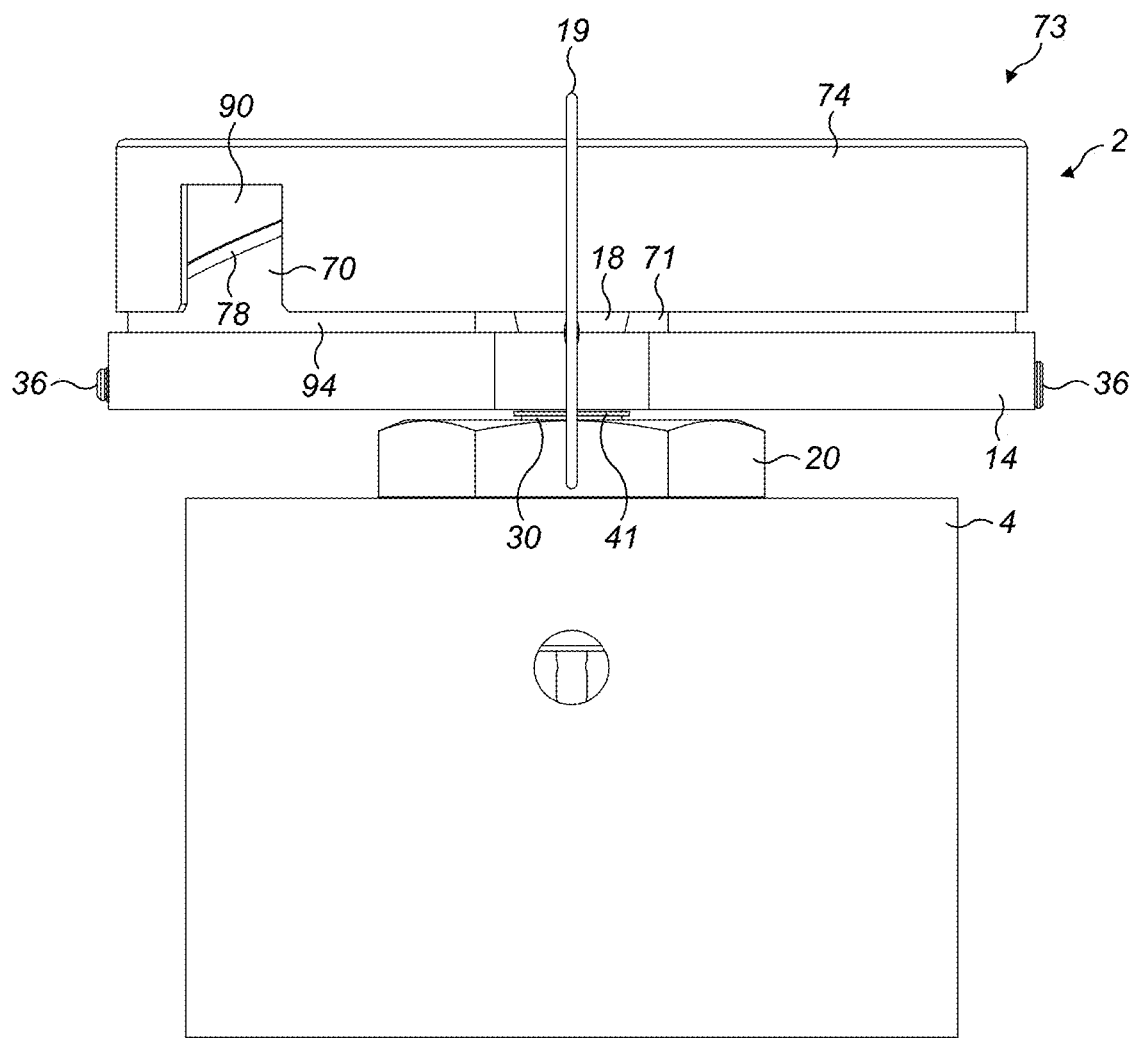
FIG. 13 is a side view of the membrane puncturing mechanism of FIG. 1.
Figure 14:
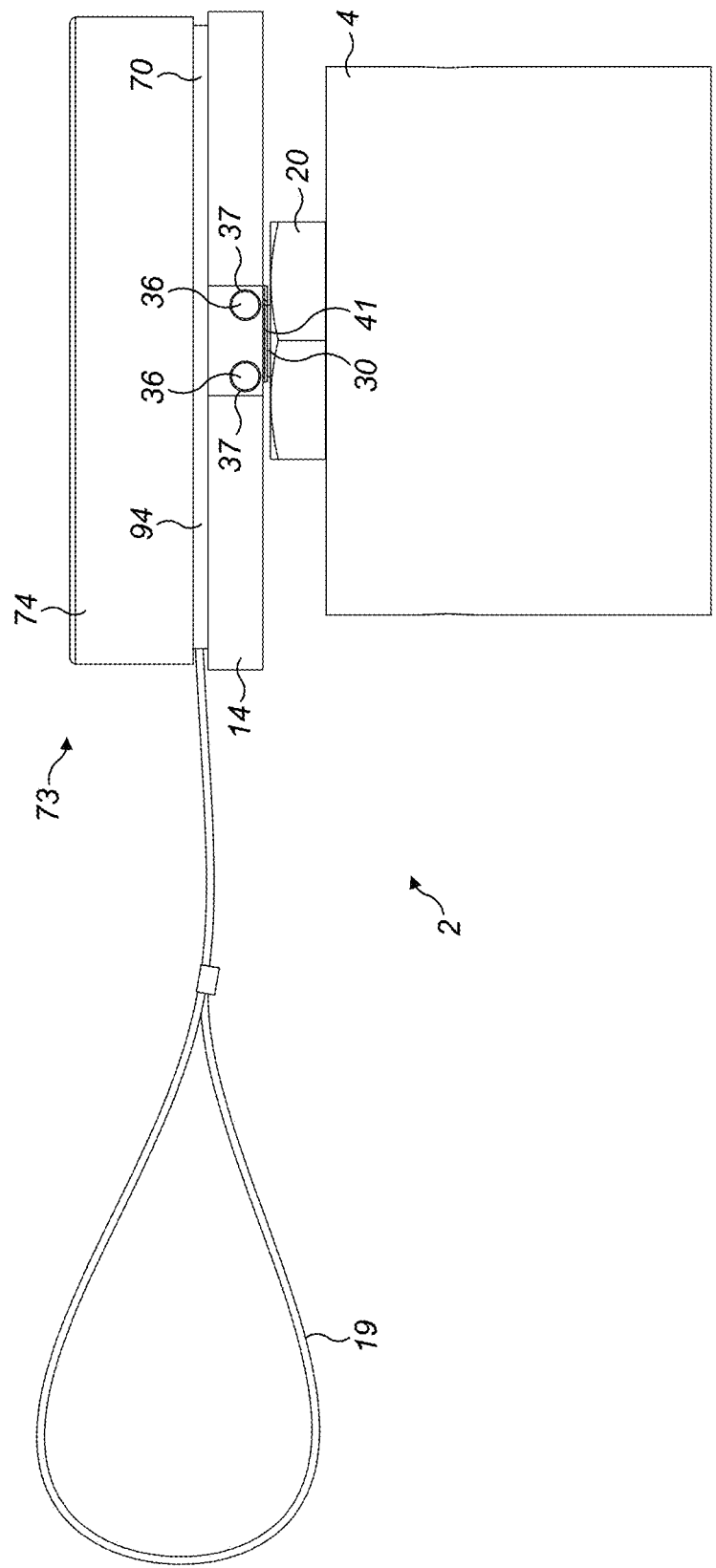
FIG. 14 is another side view of the membrane puncturing mechanism of FIG. 1.
Figure 15:
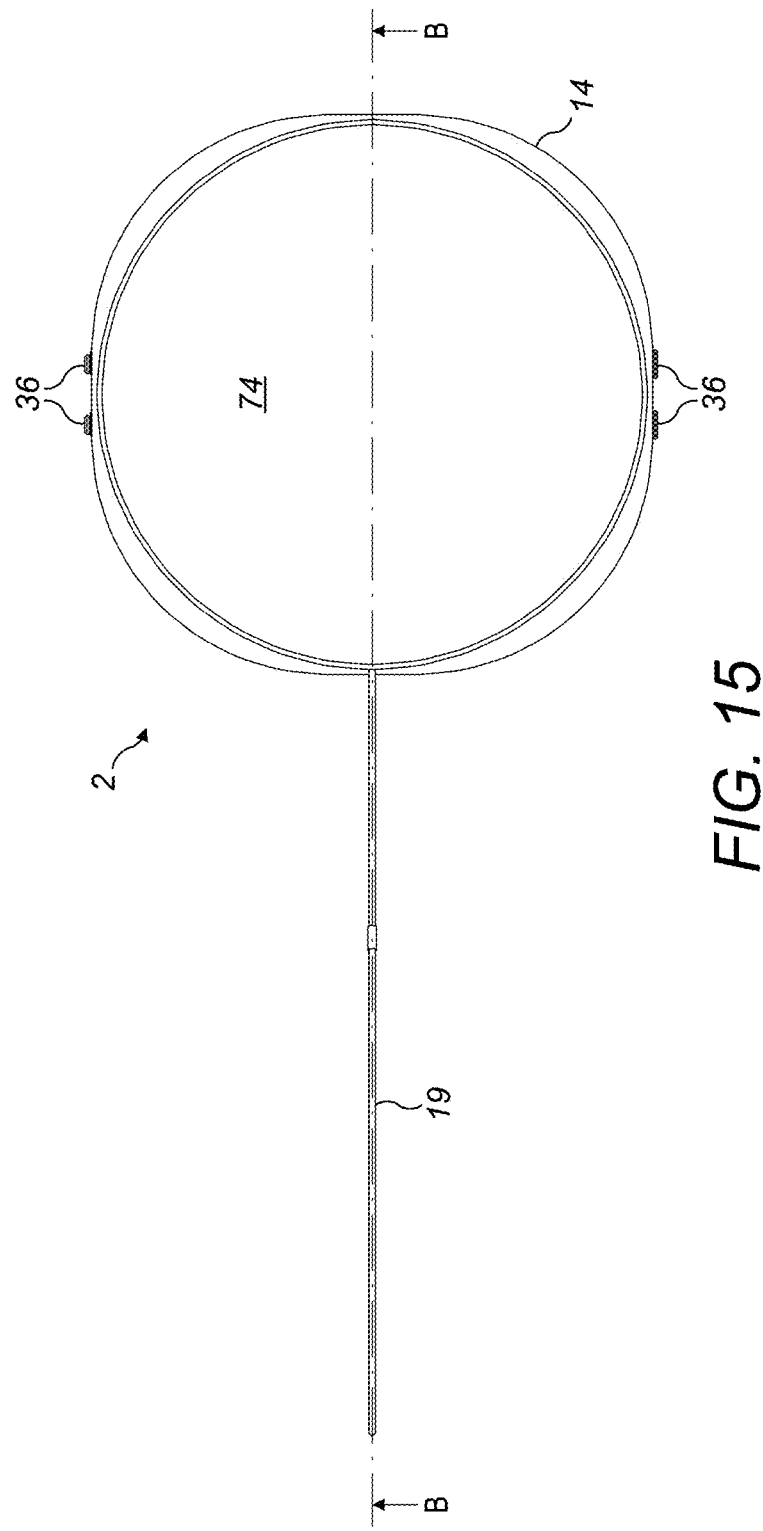
FIG. 15 is a plan view of the membrane puncturing mechanism of FIG. 1, with the cross-sectional view of FIG. 1 taken along line B-B.
Figure 16:
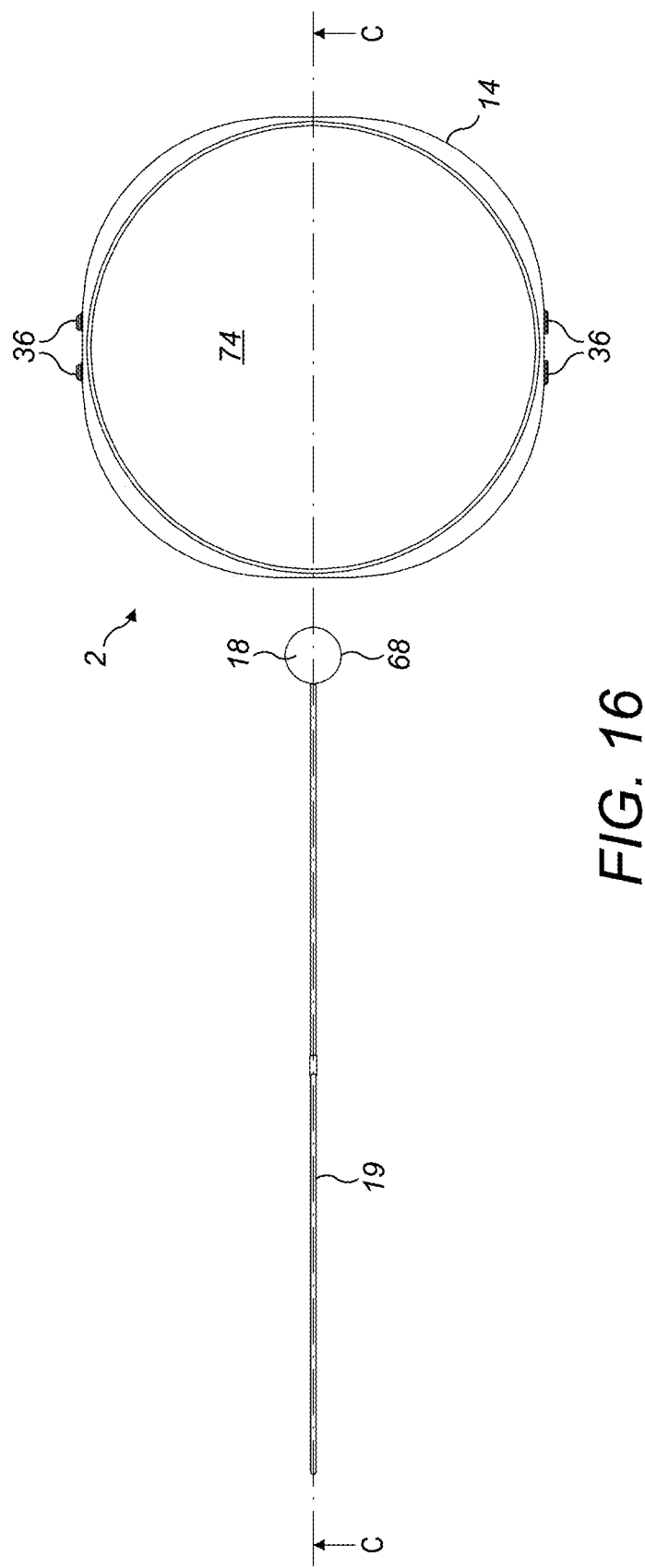
FIG. 16 is a plan view of the membrane puncturing mechanism of FIG. 1 in a released state, with the part-cross-section view of FIG. 5 taken along line C-C.

Unlocking the locking mechanism 73 raises the lid 74 up far enough to allow the pin 10 to be raised into the fully loaded state of the puncturing mechanism 2, as shown in FIGS. 3, 4 and 9.

With reference to FIGS. 8 to 12, the lid 74 is coupled to the wall 70 by a cam and follower mechanism. A groove 78 is recessed in the wall 70, providing a cam surface 79, and a guide pin 80 protrudes from the inside side surface 82 of the lid 74, providing a follower 80. The guide pin 80 is received by the groove 78 and moves along the groove 78 to raise and lower the lid 74 as the lid 74 is rotated about the wall 70. The groove 78 forces the guide pin 80 to move up and down along the incline of the groove 78. In other embodiments, the cam surface 79 may be open-topped, instead of recessed as a groove 78. In other embodiments, the guide pin 80 may be formed in the wall 70 and the groove 78 may be formed in the inside side surface 82 of the lid 74.

Figure 6:
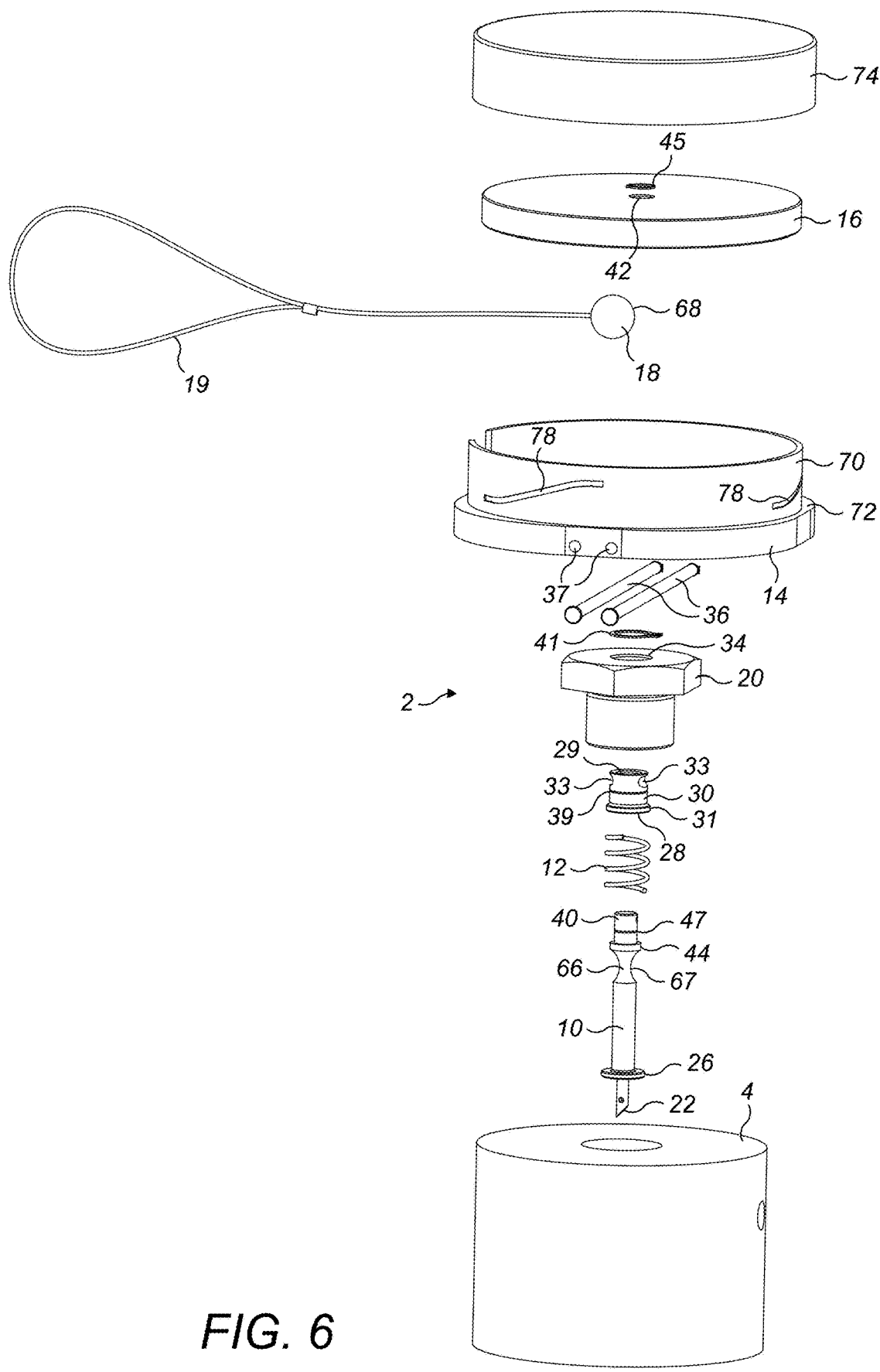
FIG. 6 is an exploded perspective view of the membrane puncturing mechanism of FIG. 1.
Figure 7:
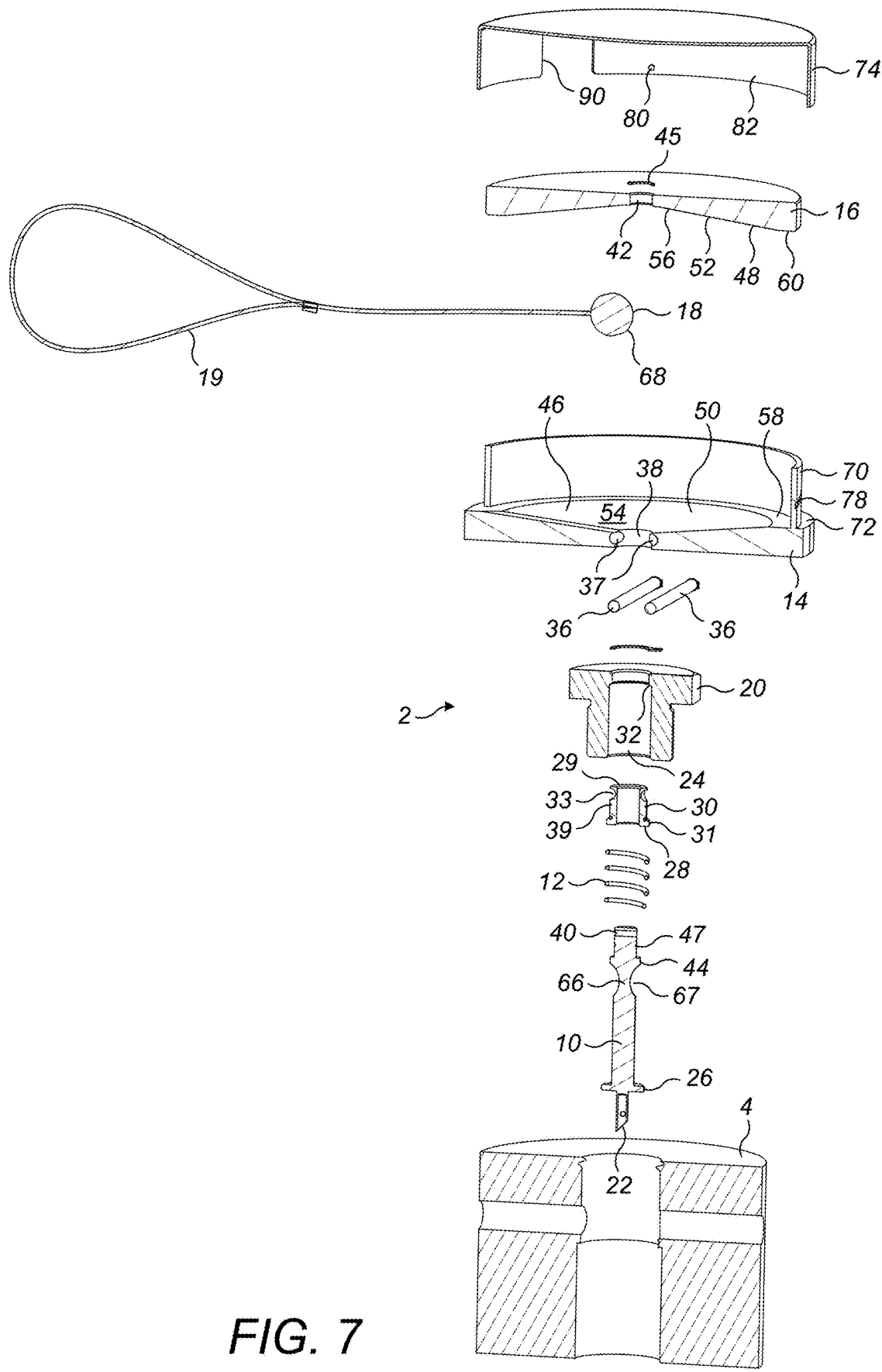
FIG. 7 is an exploded cross-sectional view of the membrane puncturing mechanism of FIG. 1.

As shown in FIGS. 6 and 7, the illustrated embodiment has three cam and follower mechanisms. This is shown by the two grooves 78 spaced apart around the wall 70 in FIG. 6, and the guide pin 80 shown on the inside side surface 82 of the lid 74 in FIG. 7. The lid 74 therefore has two further guide pins 80 (not shown) to each be received by the grooves 78 shown in FIG. 6, and a further groove 78 (not shown) to receive the guide pin 80 shown in FIG. 7. Other embodiments may have more or less than three cam and follower mechanisms. Some embodiments may have two cam and follower mechanisms which may be arranged on opposing sides of the lid 74 and wall 70. Having additional cam and follower mechanisms improves the stability of the locking mechanism 73.

When the lid 74 is fully locked, the guide pin 80 is positioned between the lower end 84 of the groove 78 and detents 86. When the lid 74 is fully unlocked, the guide pin 80 is positioned between detents 88 and the upper end 92 of the groove 78. The detents 86, 88 narrow the width $W_T$ of the track 78 to less than the corresponding width $W_P$ of the guide pin 80 so that extra force must be applied in the rotation of the lid 74 move the guide pin 80 past the detents 86, 88. The detents 86, 88 prevent accidental rotation of the lid 74 out of the locked or unlocked positions and so prevent accidental actuation of the valve 4 when the lid 74 is accidentally opened and failure of the valve 4 to actuate when the lid 74 is accidentally closed.

The lid 74 has an opening 90 which lines up with the gap 71 in the wall 70 when the lid 74 is in the unlocked position (FIG. 9) to allow the actuator 18 to be pulled out from between the lower and upper elements 14, 16. When the lid 74 is in the locked position (FIG. 8), the opening 90 in the lid 74 is not lined up with the gap 71 in the wall 70. A gap 94 between the lid 74 in the locked position (FIG. 8) and the base of the wall 70 provides space for the lanyard 19 to protrude from the gap 71 in the wall 70 so that a user can access the lanyard 19 in the locked position.

Use of the puncturing mechanism 2 to actuate an inflation valve 4 will now be described with reference to FIGS. 1 to 10.

The puncturing mechanism 2 is initially assembled in its holding state so that the valve 4 is not actuated until it needs to be. The spring 12 is mounted onto the pin 10 and the pin 10, spring 12 and bushing 30 are inserted into the bore 24 of the mount 20 through the bottom 35 of the bore 24 so that the upper end 40 of the pin 10 and the upper end 29 of the bushing 30 extend upward through the top 34 of the bore 24.

The lower element 14 is mounted onto the bushing 30 by threading the upper end 40 of the pin 10 and the upper end 29 of the bushing through the opening 38 in the lower element 14. Bolts 36 are inserted into the lower element 14 through the bores 37 and along the recesses 33 in the upper end 29 of the bushing 30 to fix the bushing 30 and lower element 14 to each other but to allow the lower element 14 to rotate relative to the mount 20. The upper element 16 is then added by threading the upper end 40 of the pin 10 into the opening 42 to bring the upper element 16 into contact with the pin shoulder 44. The retaining ring 45 is fixed in the groove 47 of the pin 10 on top of the top surface 43 of the upper element 16.

The pin 10 and upper element 16 are raised, compressing the spring 12, until $S_{min}$ is greater than or equal to $H_A$ to allow the actuator 18 to be inserted. The actuator 18 is pushed between the sloping regions 50, 52 of the elements 14, 16 and up against the pin 10 to be received by the curved recess 67. The upper element 16 and pin 10 can then be released to clamp the actuator 18 between them and release the spring 12 to its partially preloaded state. The mount 20 can be coupled to the valve 4 once the spring 12 has been partially preloaded to ensure that the sharp end 22 of the pin 10 is correctly positioned to avoid premature puncturing of the valve membrane 6.

The lid 74 is placed over the elements 14, 16 and wall 70 and the guide pins 80 are received in each corresponding groove 78 of the wall 70. The lid 74 would initially be rotated to the locked position by forcing the guide pins 80 past the detents 86 at the lower ends 84 of the grooves 78.

To unlock the lid 74 for actuating the valve 4, a user rotates the lid 74 clockwise to move the guide pins 80 up their respective grooves 78 and raise the lid 74 and to align the opening 94 in the lid 74 with the gap 71 in the wall 70. The lid 74 is secured in its unlocked position by forcing the guide pins 80 past the detents 88 at the upper ends 92 of the grooves 78. To actuate the valve 4, the puncturing mechanism 2 is moved from the holding state to the fully loaded state by a user pulling the actuator lanyard 19 to move the actuator 18 away from the pin 10 and central axis A and between the flat regions 58, 60. This action raises the upper element 16 and pin 10 and compresses the spring 12. When the actuator 18 is pulled out completely from between the elements 14, 16 and through the gap 71 in the wall 70, the spring 12 extends from its compressed state and lowers the pin 10 and upper element 16 towards the valve membrane 6. Finally, the sharp end 22 of the pin 10 punctures the membrane.

After use, the puncturing mechanism 2 can be reset and put back into the holding state by reinserting the actuator 18. The puncturing mechanism 2 can then be reused with another inflation valve 4.

It will be appreciated that the above embodiments are exemplary only and that modifications thereto may be made within the scope of the disclosure. For example, other forms of locking mechanism 73 may be used. Also, the mount 20 need not be rotationally mounted relative to the lower element 14. However, a rotational connection may be useful as it may facilitate grasping of the lanyard 19. Also, while described in the context of an inflation valve 4, the mechanism 2 may be used in other equipment requiring the puncturing of a membrane.

In further examples of modifications, the spring 12 may be arranged elsewhere in the puncturing mechanism 2 and may not act upon the pin 10. The spring 12 may be arranged outside the mount 20 and/or arranged to act upon the upper element 16 and a static component of the mechanism 2. For example, the spring 12 may be a tensile spring arranged between the lower and upper elements 14, 16.

The invention claimed is:

1. A membrane puncturing mechanism comprising:
   a first element and a second element arranged with opposing surfaces, at least one opposing surface comprising a sloping region inclined relative to the other opposing surface, the first element being moveable towards and away from the second element;
   a pin for puncturing a membrane, the pin being coupled to the first element such that movement of one of the pin and first element causes movement of both;
   a spring operable to bias the first element towards the second element; and
   an actuator removably positioned between the opposing surfaces, the actuator being withdrawable from between and moveable along the opposing surfaces such that, as the actuator is withdrawn, the actuator progressively moves the first and second elements apart against the bias of the spring so as to load the spring and such that the actuator being fully withdrawn from between the opposing surfaces allows the first element to move towards the second element under the load of the spring thereby moving the pin for puncturing the membrane.

2. The membrane puncturing mechanism of claim 1, wherein both opposing surfaces comprise a sloping region, each sloping region being inclined relative to the other.

3. The membrane puncturing mechanism of claim 1, wherein the sloping region has a constant gradient.

4. The membrane puncturing mechanism of claim 1, wherein the sloping region provides a frustoconical recess in the opposing surface.

5. The membrane puncturing mechanism of claim 1, wherein at least one opposing surface is circular.

6. The membrane puncturing mechanism of claim 1, wherein the second element comprises an opening through which the pin passes.

7. The membrane puncturing mechanism of claim 1, wherein the pin comprises a narrowed throat portion for accommodating the actuator before the actuator is withdrawn from between the opposing surfaces.

8. The membrane puncturing mechanism of claim 1, further comprising a mount for coupling the membrane puncturing mechanism to a valve, wherein the mount houses the spring and part of the pin.

9. The membrane puncturing mechanism of claim 8, further comprising a bushing which couples the mount to the second element to allow the second element to rotate relative to the mount.

10. The membrane puncturing mechanism of claim 1, wherein the actuator is a ball.

11. The membrane puncturing mechanism of claim 2, wherein each sloping region has a constant gradient.

12. The membrane puncturing mechanism of claim 2, wherein each sloping region provides a frustoconical recess in the respective opposing surface.

13. A membrane puncturing mechanism comprising:
    a first element and a second element arranged with opposing surfaces, at least one opposing surface comprising a sloping region inclined relative to the other opposing surface, the first element being moveable towards and away from the second element
    a pin for puncturing a membrane, the pin being coupled to the first element such that movement of one of the pin and first element causes movement of both;
    a spring operable to bias the first element towards the second element, wherein the second element is positioned between the spring and the first element; and
    an actuator removably positioned between the opposing surfaces, the actuator being withdrawable from between and moveable along the opposing surfaces such that, as the actuator is withdrawn, the actuator progressively moves the first and second elements apart against the bias of the spring so as to load the spring and such that the actuator being fully withdrawn from between the opposing surfaces allows the first element to move towards the second element under the load of the spring thereby moving the pin for puncturing the membrane.

14. A membrane puncturing mechanism comprising:
    a first element and a second element arranged with opposing surfaces, at least one opposing surface comprising a sloping region inclined relative to the other opposing surface, the first element being moveable towards and away from the second element;

a pin for puncturing a membrane, the pin being coupled to the first element such that movement of one of the pin and first element causes movement of both;

a spring operable to bias the first element towards the second element;

an actuator removably positioned between the opposing surfaces, the actuator being withdrawable from between and moveable along the opposing surfaces such that, as the actuator is withdrawn, the actuator progressively moves the first and second elements apart against the bias of the spring so as to load the spring and such that the actuator being fully withdrawn from between the opposing surfaces allows the first element to move towards the second element under the load of the spring thereby moving the pin for puncturing the membrane; and a locking element moveable between a locked position to prevent removal of the actuator from between the opposing surfaces and an unlocked position to allow removal of the actuator from between the opposing surfaces.

15. The membrane puncturing mechanism of claim 14, wherein the locking element comprises a lid which fits over the first element and in its locked position prevents movement of the first element away from the second element, the mechanism further comprising a cam surface and follower arranged such that rotational movement of the locking element lifts the locking element away from the first element, thereby allowing movement of the first element away from the second element in the unlocked position.

16. The membrane puncturing mechanism of claim 15, wherein the second element comprises an upstanding wall in which the cam surface is defined and the lid comprises the cam follower which is received by the cam surface, the cam surface optionally being formed as a groove.

17. The membrane puncturing mechanism of claim 16, wherein the groove comprises detents, optionally in the form of narrowed regions, to retain the cam follower in the locked and unlocked positions.

\* \* \* \* \*